UNITED STATES PATENT OFFICE.

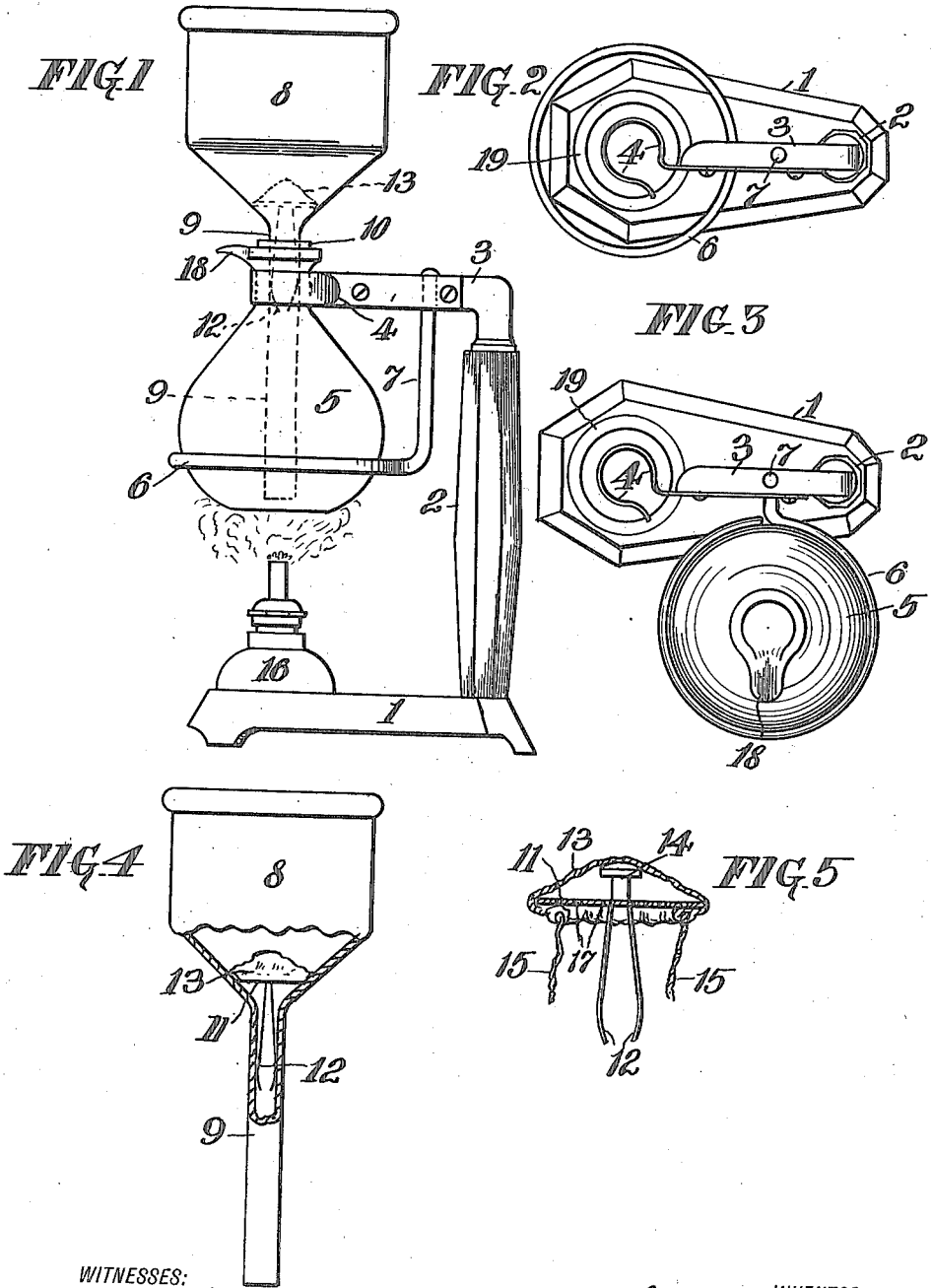

GUSTAVE F. HEMMING AND MAX L. BAKER, OF NEW HAVEN, CONNECTICUT.

PERCOLATOR.

1,157,778.  Specification of Letters Patent.  Patented Oct. 26, 1915.

Application filed March 8, 1915. Serial No. 12,762.

*To all whom it may concern:*

Be it known that we, GUSTAVE F. HEMMING and MAX L. BAKER, citizens of the United States, residing at New Haven, in the county of New Haven and State of Connecticut, have invented certain new and useful Improvements in Percolators; and we do hereby declare the following to be a full, clear, and exact description of the invention, such as will enable others skilled in the art to which it appertains to make and use the same.

Our invention relates to coffee percolators and it consists in certain details of construction to be more fully set forth in the following specification and particularly pointed out in the claim.

Referring to the drawings in which Figure 1 represents a side elevation of the percolator; Fig. 2 is an upper plan view with the water bottle or kettle and coffee holding funnel removed; Fig. 3 is an upper plan view showing the funnel removed and the kettle swung to one side; Fig. 4 is a broken detail view of the funnel showing the filter in position; and Fig. 5 is an enlarged view partly in section of the filter construction.

1 represents the base, 2 the handle projecting therefrom.

3 is an arm projecting from the top of the handle to which is secured the spring clip 4 adapted to embrace the neck of the kettle 5. As the kettle is made of glass, the advantage of this spring clip is apparent from the fact that it will expand and thus conform to the expansion of the glass; for if the glass kettle were rigidly held at the neck under the intense heat to which it is subjected, it would break.

The kettle rests in the open ring 6, which also allows for the expansion of the glass kettle at its point of contact therewith. This ring has the vertical stem 7 which is journaled in the arm 3. A slight pressure of the kettle toward the open mouth of the spring clip will release the neck of the kettle therefrom, and when released the kettle will swing to one side on its pivotal support—Fig. 3—when it can be removed from said support. To replace the kettle it is simply seated in the wire ring and said ring rotated to bring the neck of the kettle within the flexible grip of the spring clip.

The coffee holding funnel 8 has the hollow stem 9 which projects within the kettle and near the bottom thereof. To insure a tight connection between the funnel and kettle, the flexible stopper 10 has an opening therethrough adapted to firmly embrace the stem while the stopper fits closely the mouth of the kettle.

The strainer comprises the metal plate 11, Figs. 4 and 5, having the spring fingers 12 adapted to contact with the interior walls of the funnel stem to hold the strainer plate firmly against the inclined sides of the funnel and also the fabric cap 13. The edges of this cap are tucked under the outer edge of the plate and rest directly against the inclined sides of the funnel to prevent leakage at that point. 14 is a handle for inserting the strainer device into the funnel and removing it therefrom. The fabric cap loosely embraces this handle, so that the handle can be grasped, while embraced by the cap, to remove the strainer device against the tension of the spring fingers, or, as before mentioned, to firmly seat the same and without disturbing the fabric cap. This cap is removably secured to the underside of the plate 11 by means of the pucker strings 15. Water, either hot or cold, is poured into the kettle and dry coffee is placed in the funnel on top of the strainer. The lamp 16 furnishes the necessary heat for generating sufficient steam in the kettle to force water therefrom up the funnel stem 9 and through the strainer to mingle with the coffee, and the liquid will return to the kettle as soon as the lamp is removed. To facilitate the upward and downward flow of the liquid, holes 17 are formed in the strainer plate. The liquid having returned to the kettle and the funnel removed, the remainder of the device is used as an ordinary pitcher. By means of the handle 2, the kettle is tilted and its contents poured out through its spout 18 without unseating the kettle or disturbing its position. The recess 19 is formed in the base to properly locate the lamp under the kettle.

Having thus described our invention, what we claim is:—

The combination in a percolator having a base, a vertical handle portion projecting therefrom, a kettle to which heat is applied, an overhanging arm projecting from the handle, a spring clip carried by the arm adapted to partially and flexibly embrace the neck of the kettle, and a pivotally supported seat for the kettle on which the kettle is adapted to swing to and from the spring clip.

In testimony whereof we affix our signatures in presence of two witnesses.

GUSTAVE F. HEMMING.
MAX L. BAKER.

Witnesses:
MARY E. GUENBERG,
HARRY L. BROOKS.